March 1, 1966 H. L. CROSWHITE 3,237,398
HYDROSTATIC POWER TRANSMISSION SYSTEM
Filed June 1, 1964 6 Sheets-Sheet 1

Fig. 1A

INVENTOR:
HOWARD L. CROSWHITE
BY
ATTORNEYS.

United States Patent Office 3,237,398
Patented Mar. 1, 1966

3,237,398
HYDROSTATIC POWER TRANSMISSION SYSTEM
Howard L. Croswhite, Livonia, Mich., assignor to Ford Motor Company, Dearborn, Mich., a corporation of Delaware
Filed June 1, 1964, Ser. No. 371,574
8 Claims. (Cl. 60—19)

My invention relates generally to power transmission systems having infinitely variable torque ratio characteristics, and more particularly to a hydrostatic power transmission system having positive displacement hydrostatic units situated in a closed hydrostatic circuit to define power delivery paths from a driving member to a driven member. My mechanism is adapted especially to be used in an automotive vehicle driveline for delivering power from an internal combustion vehicle engine to the vehicle traction wheels.

The embodiment of my invention herein disclosed includes a pair of positive displacement hydrostatic units, each of which comprises a rotary cage or cylinder body with a plurality of radial cylindrical openings disposed therein. Each opening receives a ball piston element. The ball piston elements are surrounded by a cam ring having an internal cam surface that is adapted to be engaged by the individual ball piston elements.

The driving portions of the system are connected drivably to the cage for a first unit of the pair of hydrostatic units and to the cam ring for the second hydrostatic unit. The cage for the second hydrostatic unit is connected to driven portions of the system. The displacement of the second hydrostatic unit is maintained at a constant value by reason of the fixed eccentricity of the cam ring with respect to the axis of the units. In contrast, the displacement of the first hydrostatic unit can be varied by adjusting appropriately the eccentricity of its cam ring. The high pressure side and the low pressure side of each unit are situated in a closed hydrostatic circuit so that the fluid delivered by one unit is received by the other.

My transmission arrangement can be described as a so-called hyperbolic system since the over-all torque ratio that can be achieved is related to the displacement ratio of the units with a hyperbolic function. The displacement ratio is controlled by appropriately adjusting the race for the variable displacement unit. If the displacement of the variable displacement unit is adjusted so that it equals the displacement of the fixed displacement unit, all of the fluid displaced by one unit during one revolution is received by the other and the power flow path is interrupted. This is a so-called neutral condition. If the displacement of the variable displacement unit is decreased from a neutral value to a lesser displacement, the speed ratio decreases progressively. At this time the speed of the cage of the fixed displacement unit is driven at a lesser speed than the speed of the driving portions of the system. The fixed displacement unit thus functions as a pump and delivers oil under pressure to the variable displacement unit. The race for the variable displacement unit is anchored against the transmission housing and torque multiplication thus is achieved because of this regenerative action. If the displacement of the variable displacement unit becomes zero, a hydraulic lock exists in the hydrostatic system and all of the power is distributed mechanically from the driving portions of the system to the driven portions. If the displacement of the variable displacement unit is adjusted still further in that same direction, an overdrive condition is achieved with the variable displacement unit acting as a pump and the fixed displacement unit acting as a motor. The cage of the fixed displacement unit then overruns its race, and the driven speed thus is greater than the speed of the driving portion of the system.

If the displacement of the variable displacement unit is adjusted in the opposite direction beyond the neutral position, the cage of the fixed displacement unit is driven in a direction opposite to the direction of rotation of the power input portion of the system and at a greater absolute speed. This establishes reverse drive.

Each hydrostatic unit is provided with a radial porting system having internal passages that connect the porting for the units hydraulically. The passages are formed internally in torque delivery members of the system about which the cages for the hydrostatic units are journaled for rotation.

The displacement of the variable displacement unit is controlled by two fluid pressure operated servos that act upon the adjustable cam ring. As control pressure is distributed to one servo the race is shifted in one direction causing a reduction in speed ratio. If control pressure is distributed to the other piston, a speed ratio increase is accomplished. The relative pressure in the ratio adjusting servos is controlled by means of a ratio control valve that responds to the vehicle operator's demand for engine torque and to engine speed. The torque demand signal is obtained by means of a throttle valve mechanism that is connected mechanically to the engine carburetor throttle valve used for controlling the flow of the fuel-air mixture in the engine intake manifold. An increase in engine carburetor throttle setting will result in an increase in the magnitude of this signal.

For any given engine speed an increase in the magnitude of the throttle valve signal will result in an increase in displacement and hence an increase in the transmission torque ratio. This causes an unbalance in the control pressure distributed to the controlling servos so that an increase in transmission ratio will result while the vehicle speed remains constant. This then causes an increase in engine speed. The ratio control valve responds to this increase in engine speed and the ratio control valve responds to restore the balance of the pressures on the ratio control pistons.

If the power output of the engine should exceed the road load power requirements at any time, the vehicle will accelerate and the engine speed will tend to increase if the transmission ratio remains constant. But an increase in engine speed is sensed by the ratio valve thereby again unbalancing the pressure distribution to the ratio control cylinders to decrease torque ratio. Thus, the engine speed cannot increase beyond that value that corresponds to the optimum vehicle carburetor throttle setting that is selected.

If the road load power requirements should increase for any reason after a cruising speed is achieved and the engine carburetor throttle setting remains unchanged, the vehicle will tend to decelerate. Such a reduction in vehicle speed tends to decrease engine speed, and the ratio control valve responds to this change in speed to cause an adjustment in the pressure distribution to the ratio control pistons, which in turn causes an increase in torque ratio. Engine speed then again is prevented from decreasing for any given throttle setting.

It is an object of my invention to utilize these control functions in a transmission system of the type above described to provide a regulated engine speed control system wherein various engine carburetor throttle settings correspond to predetermined governed engine speeds. I contemplate that a calibrated engine throttle operating cam can be provided between a vehicle operator controlled accelerator pedal and the engine throttle valve itself so that for each engine speed that is encountered during operation, an optimum manifold pressure will be obtained. This manifold pressure can be chosen so that it corresponds to the minimum brake specific fuel consumption point for the particular engine that is used. The provision of a system having this characteristic is another object of my invention.

It is a further object of my invention to provide a valve system for use in an arrangement of the type above set forth and that will function to overrule the operation of the ratio controlling element to limit the maximum pressure for the hydrostatic circuit of which the hydrostatic units form a part. Thus, the control system will respond in the manner previously described whenever the pressure developed on the high pressure side of the hydrostatic circuit is less than a predetermined value and wherein the controlling function will be overruled to prevent an increase in pressure beyond that predetermined value.

In an arrangement of this type it is undesirable to allow engine speed to increase to the normal value that would be dictated by the automatic ratio control valve and its associated signal valve sources when the vehicle speed is low. Thus, during acceleration from a standing start it is undesirable to allow the engine speed to reach immediately that value that normally would correspond to the advanced throttle setting that happens to be selected by the vehicle operator. It is an object of my invention, therefore, to provide a means for upsetting the normal balance point for the ratio control valve system during acceleration so that the transmission ratio will tend to assume a higher speed ratio condition than that which would normally be achieved under steady state cruising conditions with the same throttle setting. As the vehicle speed increases, the overruling influence should be decreased progressively so that the automatic control functions of the ratio control valve and its associated signal valves are restored. The provision of a system having this desirable start-up characteristic is another object of my invention.

For the purpose of describing my invention more particularly, reference will be made to the accompanying drawings, wherein.

Figure 1A:
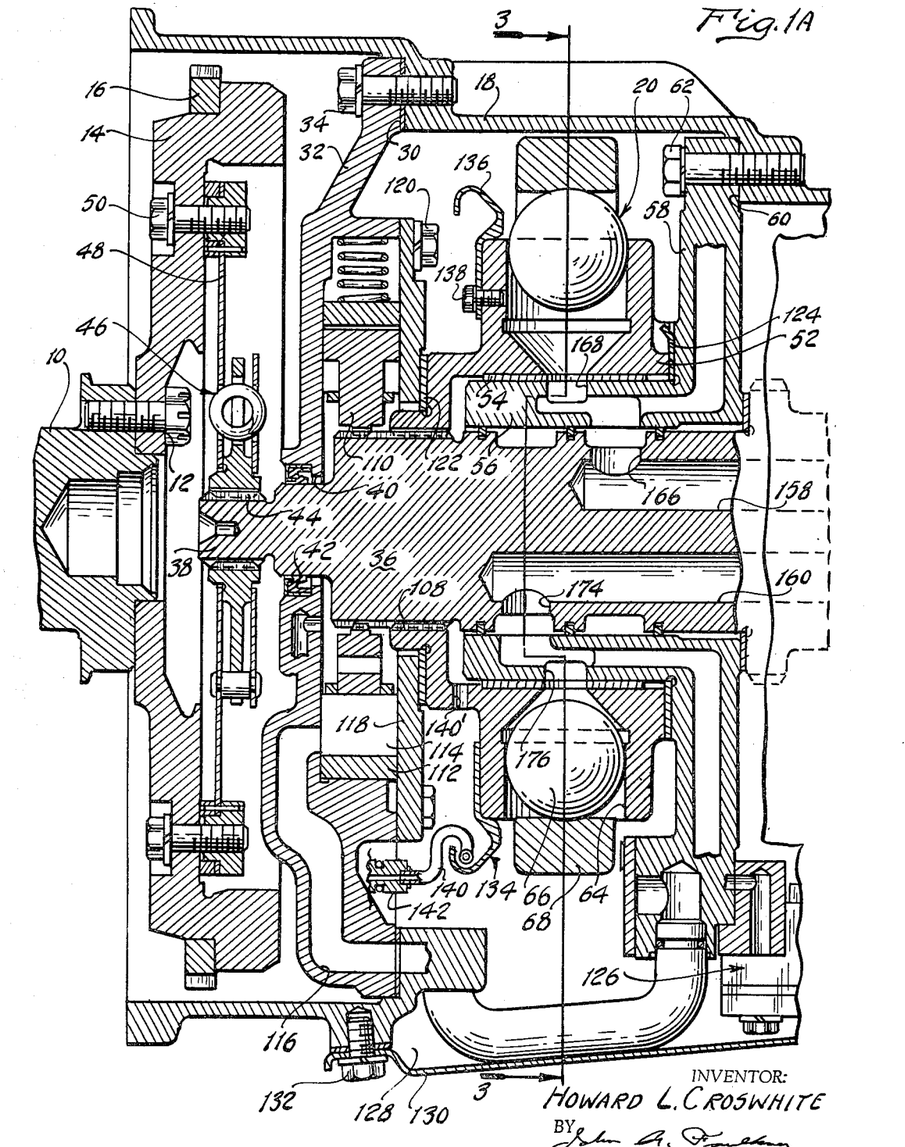
FIGURES 1A and 1B show in longitudinal cross sectional form a hydrostatic power transmission system having ball piston hydrostatic units that form a hydrostatic power delivery path from a driving member to a driven member.
Figure 1B:
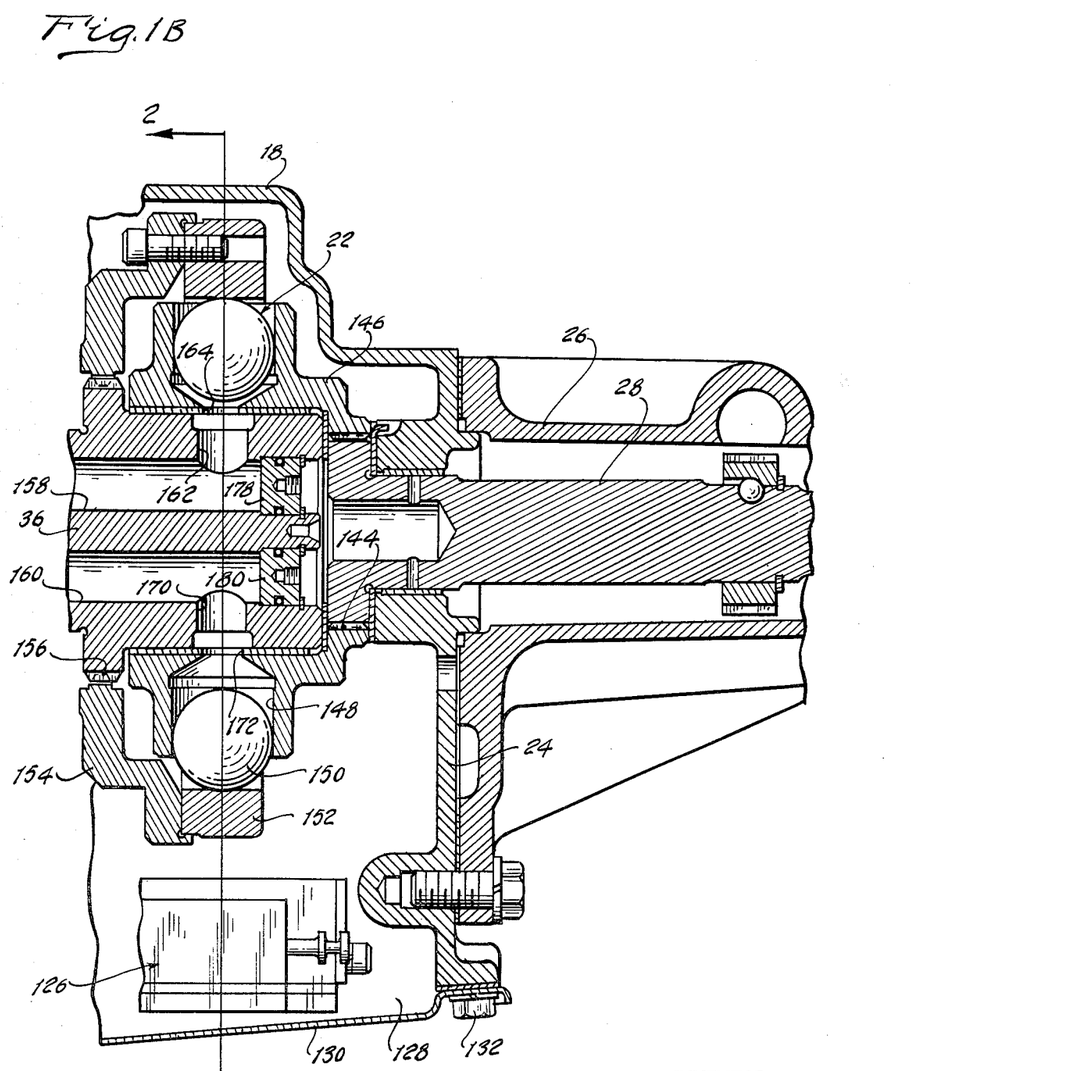

In FIGURES 1A and 1B, numeral 10 designates a portion of the crankshaft for an internal combustion vehicle engine, not shown. It is connected by means of bolts 12 to the hub of an engine flywheel 14 which carries an engine starter ring gear 16. A power transmission housing 18 encloses a pair of hydrostatic units indicated generally by reference characters 20 and 22. An end wall 24 of the housing 18 has secured thereto a tailshaft extension housing 26 that encloses a power output shaft 28. This shaft can be connected to the vehicle traction wheels through a suitable driveline and differential and axle assembly.

Housing 18 is formed with an internal shoulder 30 to which is secured a forward transmission end wall 32, suitable bolts 34 being provided for this purpose.

A central torque delivery shaft 36 is formed with a reduced diameter portion 38 which is received through a central opening 40 formed in the wall 32. The opening is sealed by means of a fluid seal 42 that surrounds portion 38. Portion 38 is splined at 44 to the hub of a spring damper assembly 46. This assembly forms a part of a drive plate 48 that is bolted by means of bolts 50 to the flywheel 14.

Hydrostatic unit 20 includes a cylinder body in the form of a cage 52 which is journaled by bushings 54 upon a sleeve shaft extension 56 for a center support wall 58. This wall is secured to an internal shoulder 60 in the housing 18 by means of bolts 62. The cage 52 is formed with a plurality of radial cylindrical openings, preferably nine in number, as shown at 64. Each opening receives a ball piston element 66 which is adapted to reciprocate therein. Surrounding the balls 66 is a cam race 68 having an inner cam surface that is engaged by the balls 66. This surface can be grooved to increase the area of contact between the balls and the race.

Figure 3:
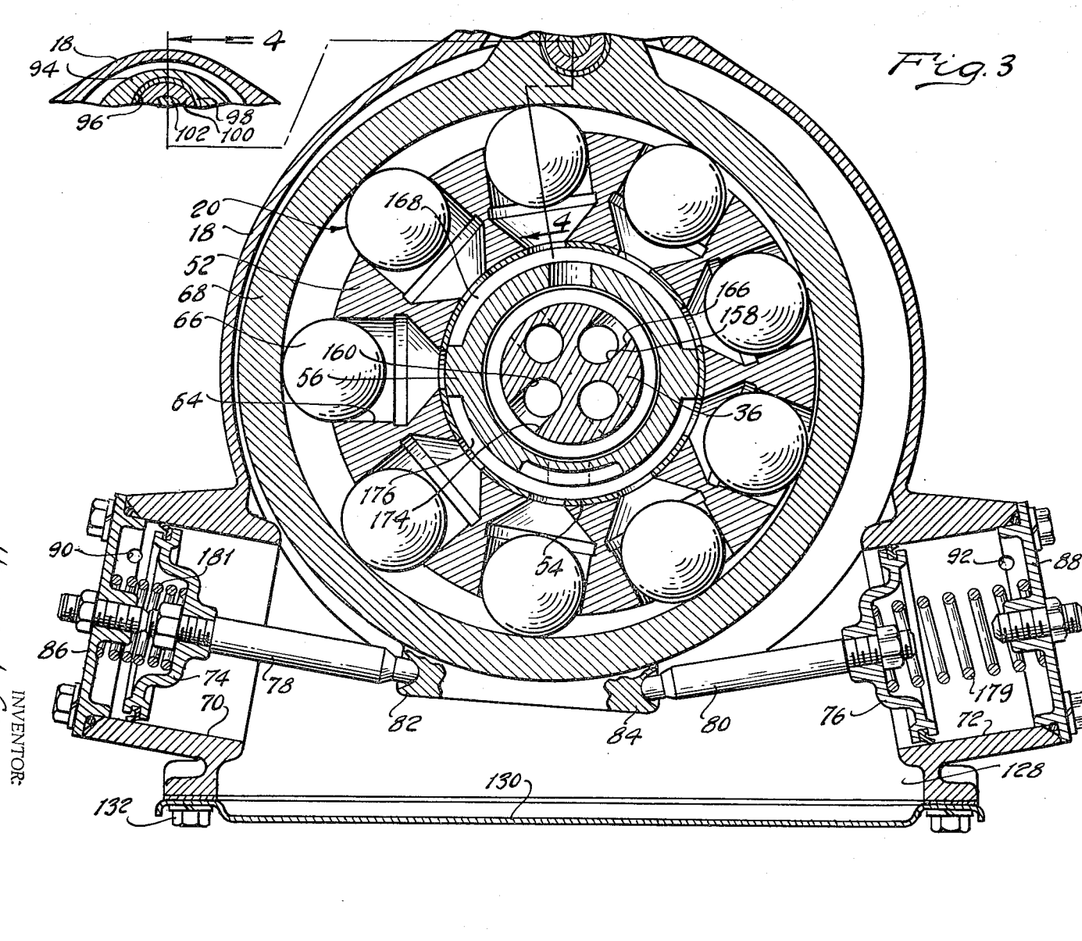
FIGURE 3 is a cross sectional view taken along the plane of section line 3—3 of FIGURE 1A. It shows the details of the construction of the variable displacement hydrostatic unit.

Formed in the housing 18 on opposed sides of the axis of the hydrostatic unit 20 is a pair of cylinders for fluid pressure operated servos. The cylinders are defined by cylindrical openings 70 and 72, respectively. Pistons 74 and 76 are received respectively within the openings 70 and 72. They carry extensions in the form of stems 78 and 80 which respectively engage cooperating recesses formed in bosses 82 and 84 formed on the cam race 68. Centering springs 181 and 179 respectively act upon the pistons 74 and 76.

Two closure members 86 and 88 are bolted to the outward sides of the openings 70 and 72, respectively, thereby defining a pressure chamber behind each piston. The springs 181 and 179 are disposed in these chambers. Fluid pressure may be admitted to the respective fluid chambers through pressure ports 90 and 92. These form a part of the passage structure for an automatic control system that will be described subsequently with reference to FIGURES 5A and 5B.

Figure 4:
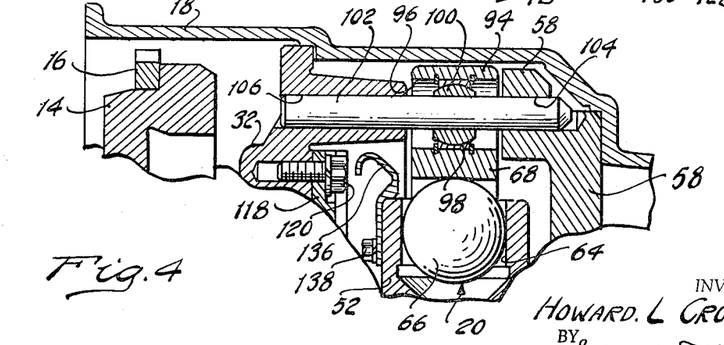
FIGURE 4 is a partial cross sectional view taken along the plane of section line 4—4 of FIGURE 3.

As best seen in FIGURE 4, the cam ring is formed with a boss 94, the position of which is 180° out of phase with respect to the bosses 82 and 84. Boss 94 is formed with an opening 96 which receives a split outer race 98 for a universal pivot connection. A crowned inner race 100, which cooperates with the concave surface of the race 98, is formed with an opening through which a pivot shaft 102 extends. This shaft is end supported within openings 104 and 106 formed in the walls 58 and 32, respectively. The cam race 68 can oscillate about the shaft 104 as pressure is admitted to the working chamber for either one or the other of the servos illustrated in FIGURE 3. This then varies the eccentricity of the inner surface of the cam race 68 so that the displacement of the hydrostatic unit 20 can be varied.

The cage 52 is splined at 108 to the torque delivery shaft 36 and then is driven by the crankshaft 10. Splined also to the shaft 36 is a rotor 110 for a variable displacement supercharge pump. This may be a vane type pump which is well known in the industry. Provision may be made, however, for varying the displacement of the pump by providing opposed fluid pressure operated piston and cylinder arrangements that are adapted to shift the cam race 112 against which the vanes 114 act.

The discharge side of the supercharge pump, shown in part at 112 and 114, communicates with a part of passage 116 formed in the wall 32. A pump closure plate 118 is secured to the interior of the wall 32 by bolts 120 thereby defining with the wall 32 a pumping chamber for the elements of the supercharge pump. The cage 52 of the hydrostatic unit 20 is separated from the plate 118 by means of a thrust washer 122. It is separated from the center support wall 58 by a thrust washer 124.

The automatic control valve body for the control system subsequently to be described with reference to FIGURE 5 is identified generally in FIGURES 1A and 1B by reference charatcer 126. It is situated within a sump region 128 defined by the lower portion of the housing 18. The sump region includes a lower access opening that is closed by an oil pan 130. Bolts 132 are used for securing the pan 130 to the housing 18.

Engine speed is sensed by a governor mechanism 134 which includes an annular trough 136 which may be bolted by bolts 138 to the cage 52. Trough 136 receives leakage oil through a port 140'. This oil accumulates in the trough 136 and forms an annular fluid ring that rotates with the rotary cage 52. A speed sensing pressure pick-up tube 140 has an open end located in the trough 136 and it faces in an upstream direction as the cage 52 rotates. The pressure picked up is distributed through tube 140 and is received by a fitting 142 which supports the tube 140. The speed signal pressure received by the tube 140 then is distributed through suitable internal passage structure, not shown, to the valve body 126 where it initiates control functions that will be described subsequently.

Figure 2:
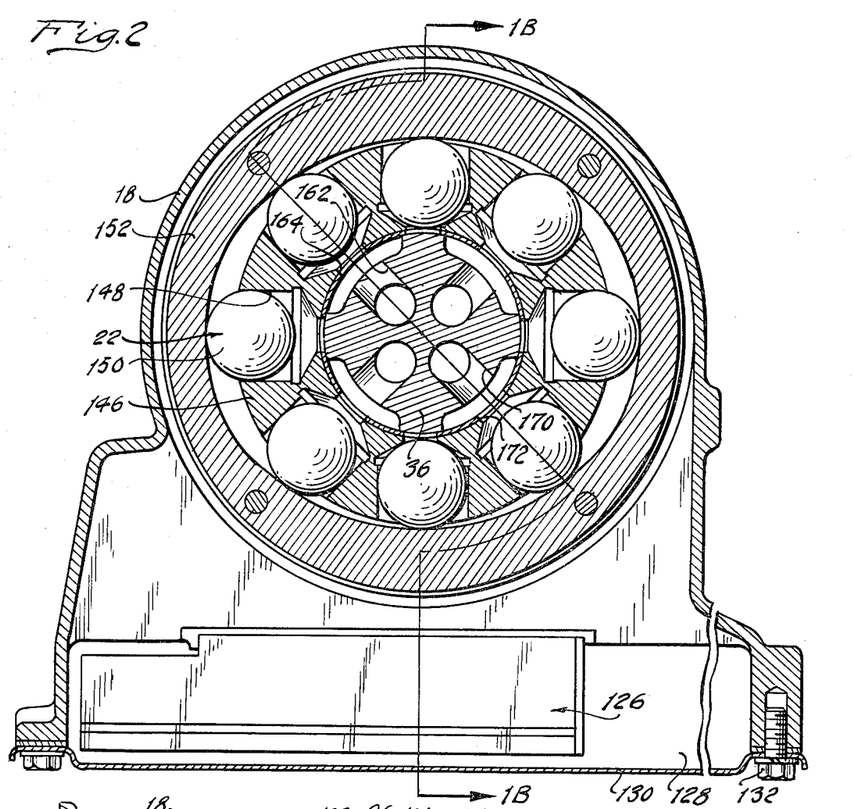
FIGURE 2 is a cross sectional view taken along the plane of section line 2—2 of FIGURE 1B. It shows the details of the construction of the fixed displacement hydrostatic unit.

The tailshaft 28, which is journaled within an opening formed in wall 24, is splined at 144 to a cylindrical body or cage 146 for a fixed displacement hydrostatic unit 22. The cage 146 preferably is formed with eight cylindrical openings 148 each of which receives a ball piston element 150. Surrounding the ball piston elements 150 is a cam race 152 having an internal surface that engages the ball piston elements 150. This internal surface can be grooved to provide an increased area of contact between each ball and the race 152.

Race 152 is carried by a supporting member 154 that is splined at 156 to the shaft 36. Thus the race 152 and the cage 52 rotate in unison with the crankshaft 10.

The race 68 acts as a reaction point for the hydrostatic system since it is held stationary by the pivot pin 102.

Shaft 36 is formed with a high pressure passage 158 and a low pressure passage 160 which extend axially. Passage 158 may be a high pressure passage and the passage 160 may be subjected to a lower supercharge pressure during forward drive operation under torque. If the direction of torque delivery is reversed, however, passage 160 becomes a high pressure passage and passage 158 becomes a low pressure passage. The same is true when the mechanism operates in reverse drive. High pressure port 158 is connected to a radial passage 162 formed in shaft member 36. This passage communicates with a radial port 164 formed in the cage for the positive displacement unit 22. Passage 158 communicates also with a radial passage 166 which in turn communicates with a radial port 168 formed in the cage 52 for the positive displacement unit 20.

Low pressure port 160 communicates with a radial passage 170 formed in shaft 36, and a radial port 172 in the rotary cage 146 communicates with passage 170.

Passage 160 communicates also through a radial passage 174 with a radial port 176 in the rotary cage 52 for the positive displacement unit 20.

The ends of the passages 158 and 160 can be sealed by closure members 178 and 180, respectively.

The cam ring 68 as viewed in FIGURE 3 will assume overdrive, direct drive, underdrive, neutral and reverse drive positions as it is adjusted in a counterclockwise direction. These positions can be obtained by appropriately distributing fluid pressure behind the pistons 74 and 76.

A spring 179 normally acts upon the piston 76 and a spring 181 acts similarly upon piston 174. These springs are calibrated so that the cam ring 68 normally will assume a neutral position "N" (see FIGURE 5A) when both servos are depressurized.

Figure 5A:
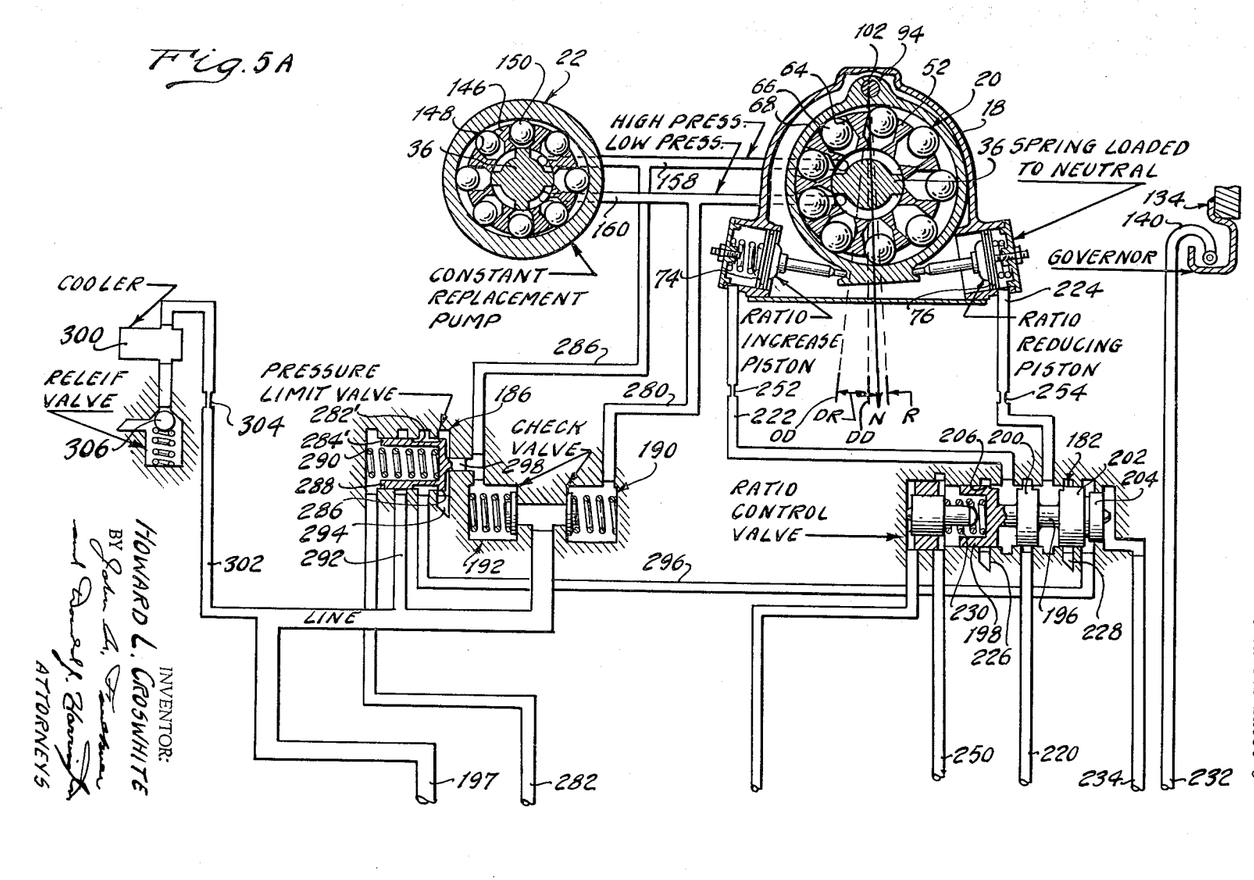
FIGURES 5A and 5B show a schematic view of a valve system for controlling the hydrostatic units of FIGURES 1A through 4.

To establish underdrive operation, the cage 68 is adjusted from a neutral position to a position intermediate the neutral position and the direct drive position DD (see the notation DR in FIGURE 5A, which designates a range of settings for forward drive). Under these conditions the output shaft and the rear cage will be driven at a speed that is less than the speed of the crankshaft 10. The hydrostatic unit 22 will act as a pump and will deliver oil under pressure to the hydrostatic unit 20 through passage 158. This will tend to drive the rotary cage 52. Since the ring 68 is anchored, a torque multiplication occurs as the driving torque is fed back again to the hydrostatic unit 22.

When the ring 68 is adjusted to the direct drive position shown at DD in FIGURE 5A, the displacement of the hydrostatic unit 20 becomes zero. Under these conditions a hydraulic lock occurs thus preventing transfer of fluid from one hydrostatic unit to the other. Thus, the cage 146 and the driven shaft 28 are powered at the same speed as the speed of crankshaft 10.

To establish overdrive operation, the ring 68 for the hydrostatic unit 20 is adjusted to the overdrive position shown at OD in FIGURE 5A. The unit 20 now acts as a pump and the unit 22 acts as a motor. In this respect the functions are reversed from that which exists during underdrive operation. The cage 146 then overspeeds the race 152.

If the ring 68 again is adjusted to a position that will allow the unit 20 to act again as a motor and if its displacement in this range becomes equal to the displacement of the unit 22, a neutral condition will exist. Thus, all of the output of one unit is received by the other and no torque delivery takes place, neither hydrostatically nor mechanically.

To obtain reverse drive the ring 68 is adjusted through the neutral position to the position "R" shown in FIGURE 5A. This causes passage 160 to function as a high pressure passage while passage 158 functions as a low pressure passage. The cage 146 then is driven in a direction opposite the direction of rotation of crankshaft 10. Any one of an infinite number of torque ratios can be obtained during forward drive as the race 68 is adjusted from the neutral position to the overdrive position.

Figure 5B:
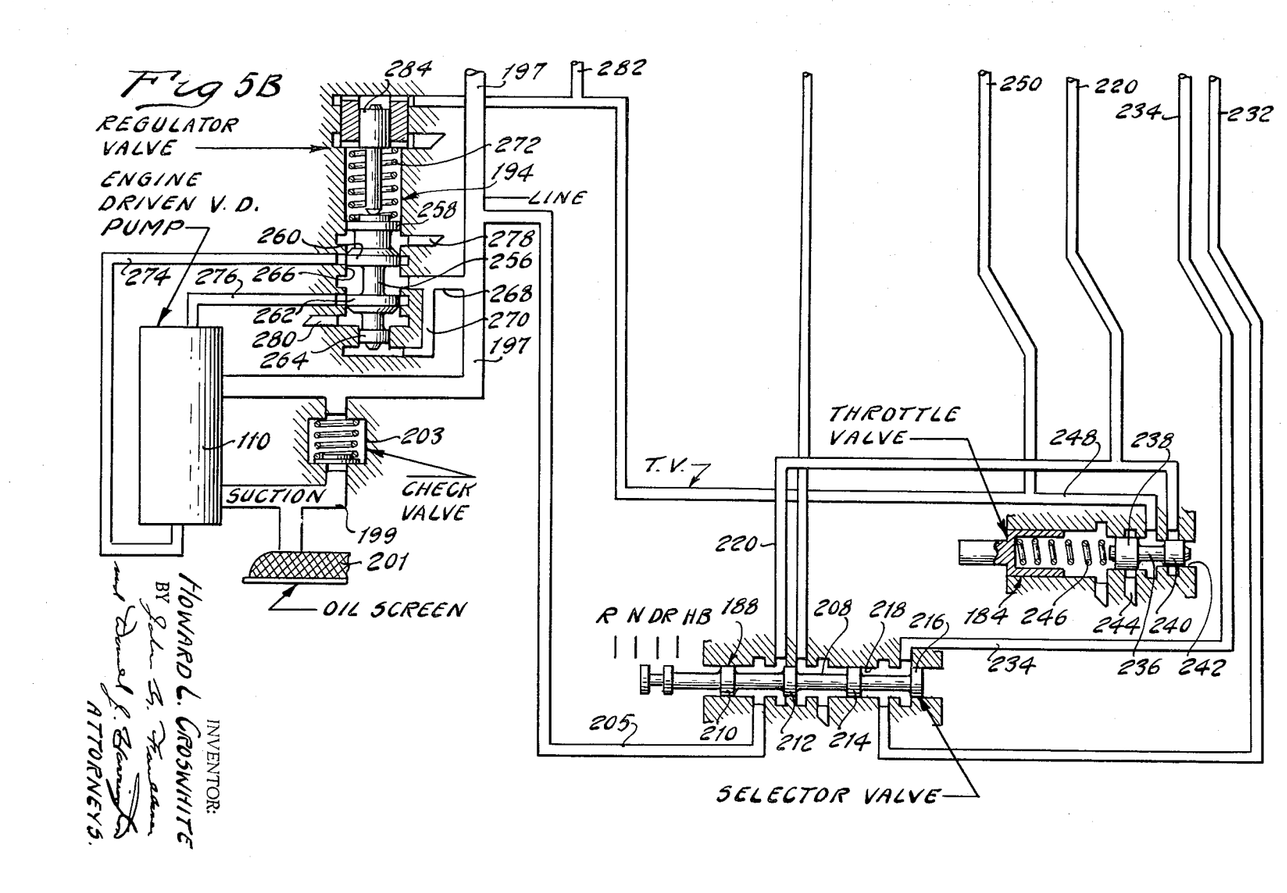

In order to provide a control system that will respond to vehicle operating requirements to produce the optimum ratio between these two extreme limits, I have provided a valve system of the type illustrated in FIGURES 5A and 5B. This system includes a ratio control valve 182, a throttle valve 184, a pressure limit valve 186, a manual valve 188, check valves 190 and 192 and a supercharge pressure regulator valve 194. The governor valve assembly 134 shown in FIGURE 1 also forms a part of the valve system of FIGURES 5A and 5B.

The ratio control valve 182 includes a valve spool 196 having four spaced valve lands 198, 200, 202 and 204. Valve lands 202 and 204 define a differential area. Each of the valve lands cooperates with an internal valve land formed in a valve chamber 206 within which the valve spool 196 is slidably disposed.

The selector valve 188 includes a valve spool 208 having four spaced valve lands 210, 212, 214 and 216. These are situated slidably within a valve chamber 218 within which are formed internal valve lands that cooperate with the external valve lands of spool 208. The operator may selector the various drive ranges by appropriately positioning the valve spool 208 by means of a suitable linkage mechanism. The reverse drive position, the neutral drive position, the forward drive range position and the hill brake position are indicated, respectively, in FIGURE 5B by reference characters R, N, DR and HB.

The variable displacement supercharge pump identified in part in FIGURE 1A by reference characters 110 and 114 has been designated for purposes of this description by reference character 110 in FIGURE 5B. Pump 110 is capable of developing pressure whenever the engine is driving. It distributes its pressure to a line pressure feed passage 197. It receives supply oil from a suction line 199 that communicates with an oil screen 201 located in the transmission sump 128. If a push start feature is introduced into the transmission system, a check valve 203 may be provided to establish one-way communication between the passage 198 and the passage 196 to permit the hydrostatic units to draw fluid into the system from the sump. During normal operation, however, the pressure in passage 197 will exceed the pressure in passage 199 and the check valve 203 will assume a closed position.

Line pressure is distributed from passage 197 to the selector valve 188 through a passage 205. Passage communicates with a valve chamber 218 at a point intermediate the lands 210 and 212 when the spool 208 assumes the drive position "DR." Pressure then is distributed through the valve chamber 218 to a passage 220 which extends to the valve chamber 206 of the ratio control valve 182. It intersects chamber 206 at a location adjacent valve land 200.

Pressure distribution passages 222 and 224 communicate respectively with the ratio control valve chamber 206 at locations intermediate valve lands 198 and 200 and between valve lands 200 and 202. Valve lands 198 and 202 are adapted to cover exhaust ports 226 and 228, respectively.

Valve spool 196 normally is urged in a right-hand direction, as viewed in the drawings, by a valve spring 230. The engine speed sensitive pressure in passage 140 is distributed to the selector valve 188 through a governor pressure passage 232. The valve chamber 218, when the spool 208 assumes the position shown, establishes communication between passage 232 and passage 234 which extends to the right-hand side of valve land 204 of the ratio control valve 182. This normally tends to urge the ratio control valve in a left-hand direction against the opposing influence of the spring 230. The magnitude of this pressure force, of course, is proportional to engine speed.

Throttle valve 184 includes a double-land valve spool 236 which has formed thereon valve lands of differential diameter as indicated at 238 and 240. Valve spool 236 is situated slidably within a valve chamber 242. With valve land 238 normally blocking an exhaust port 244, valve spool 236 is biased in a right-hand direction by throttle valve spring 246.

As the vehicle operator opens the engine carburetor throttle the spring 246 becomes depressed. This decreases the degree of communication between line pressure passage 220 and exhaust port 244. Line pressure passage 220 communicates with valve chamber 242 at a location adjacent land 240. At the same time, the degree of communication between passage 220 and a throttle pressure passage 248 is increased. This throttle pressure passage 248 communicates with the valve chamber 242 at a location intermediate valve lands 238 and 240, and the pressure in this passage 240 acts upon the differential area of these lands to urge spool 236 in a left-hand direction against the opposing influence of spring 246.

Throttle pressure passage 248 thus receives a pressure signal that is proportional in magnitude to the degree of opening of the engine carburetor throttle. This pressure signal is distributed through passage 250 to the valve chamber 206 of the ratio control valve 182 so that it acts upon the left-hand side of the valve land 198 to supplement the influence of spring 230.

During normal steady state operation, the opposing forces acting upon the ratio control valve spool 196 are balanced. Thus, a pressure balance occurs in the passages 222 and 224 leading to the ratio adjusting servos. Flow restricting orifices 252 and 254 are located in the passages 222 and 224, respectively, to stabilize the adjustment of the cam ring 68.

If the vehicle operator desires to upset the steady state driving conditions and cause the vehicle to accelerate, he depresses the engine throttle thereby increasing the load of the spring 246. The valve spool 236 functions to modulate the pressure made available to it by passage 220 and to produce a higher resulting engine throttle valve signal in passage 248. This increase in the throttle valve signal, of course, increases the force acting upon the ratio control valve spool 196 in a right-hand direction. This establishes communication between passage 220 and passage 222, and the piston 74 of the ratio controlling servo then becomes loaded. This causes the cam ring 68 to be shifted in a counterclockwise direction as viewed in FIGURES 3 and 5, which results in an increase in the transmission torque ratio. If this increase in ratio occurs while the output shaft speed or the vehicle speed remains relatively constant, an increase in engine speed will result. This then causes an increase in the governor pressure signal in passage 234 and hence an increase in the pressure forces acting upon ratio control valve spool 196 in a left-hand direction. When the increase in governor pressure matches the increase in throttle valve pressure, the ratio control valve spool will return to the neutral position and the transmission ratio change will cease. At this time, if the power output of the engine exceeds the road load power required, the vehicle will accelerate. As the vehicle speed increases, the engine speed will tend to increase as the transmission ratio remains constant. An increase in engine speed, however, causes an increase in governor pressure, as we have seen, which would unbalance the ratio control valve and stroke the cam ring 68 in a counterclockwise direction as viewed in FIGURES 3 and 5A. This would occur since communication would be established between passages 220 and 224 through the ratio control valve chamber. Thus, the engine speed cannot increase beyond that predetermined value that corresponds to the particular engine carburetor throttle setting that is chosen by the vehicle operator.

The vehicle will continue to accelerate until the road load power required balances the power output At that time a cruising steady state condition again is obtained although at an increase in throttle setting. If the road load should increase for some reason due to a change in surface conditions or an increase in grade, the vehicle will decelerate. A decrease in vehicle speed would normally tend to decrease engine speed, which would reduce also governor pressure. A decrease in governor pressure, however, would cause an unbalance in the forces acting on the ratio control valve and establish once again communication between passages 200 and 222. This, as we have seen, causes the transmission torque ratio to increase. Thus, the engine speed is prevented from decreasing regardless of changing road conditions for any given throttle setting.

It is apparent from the foregoing that a definite engine speed will be established for each engine throttle position. A precalibrated cam mechanism can be introduced into the throttle adjusting linkage system so that a proper engine manifold pressure for each throttle setting can be established to provide a minimum brake specific fuel consumption.

The regulator valve 194 includes a valve spool 256 having formed thereon spaced valve lands 258, 260, 262 and 264. Valve spool 256 is slidably disposed within a valve chamber 266 having internal valve lands that cooperate with the external valve lands of the valve spool 256. Line pressure from the pump 110 is distributed to the valve chamber 266 through a branch passage 268. It communicates with chamber 266 at a location intermediate valve lands 260 and 262. This same pressure is distributed through branch passage 270 to the lower side of land 264 thus urging spool 256 in an upward direction against the opposing influence of a valve spring 272. The valve lands 260 and 262 control the distribution of pressure to branch passage 268 to each of two pressure passages 274 and 276, which extend to the fluid pressure operated ratio adjusting servos for the variable displacement engine driven pump. An increase in pressure in passage 274 will be accompanied by a decrease in the displacement of the pump 110, and in increase in pressure in passage 276, of course, will cause an increase in the displacement of the pump 110.

The regulator valve includes two exhaust ports 278 and 280. The valve spool 256 normally assumes a balanced position with the pressures in passages 274 and 276 being at that value that is necessary to allow a proper displacement of the pump 110 to maintain the desired pressure in passage 197. If the line pressure in passage 197 should decrease for some reason, the degree of communication between passage 276 and passage 268 will increase and the degree of communication between passage 276 and exhaust port 280 will decrease. At the same time the degree of communication between passage 268 and passage 274 will decrease and the degree of communication between exhaust port 278 and passage 274 will increase. This results in an increase in the pressure in passage 276 and a decrease in the pressure in passage 274. This then causes an increase in the displacement of pump 110 which tends to restore the pressure in passage 197 to its original value. As the pressure again is restored, the spool 268 assumes its original position. If the pressure should increase in passage 197 for some reason, however, the same operating characteristics of the valve spool 256 will cause a decrease in the pressure in passage 276 and an increase in the pressure in passage 274. This will cause a decrease in the displacement of the pump 110 which tends to reduce the pressure in passage 197 to its original value.

During normal forward driving operation under torque, check valve 190 establishes one-way communication between passage 197 and passage 280, which in turn communicates with the low pressure side of the hydrostatic circuit. Thus passage 160 becomes supercharged with the pressure that is made available by the pump 110 and the regulator valve 194.

Upon an increase in torque demand by the vehicle operator, the throttle pressure signal will increase as explained previously. Passage 248 communicates with the passage 282 and this increase in the throttle pressure signal then is distributed through the passage 282, which extends to the upper end of a valve piston element 284 located in the regulator valve assembly. The resulting pressure force due to the throttle pressure signal acting upon the element 284 is distributed directly to the valve spool 256 thereby supplementing the action of valve spring 272. Thus an increase in the engine throttle setting will result in an increase in the regulated line pressure made available to line pressure passage 197. The higher pressures in the hydrostatic circuit that accompany an increase in the torque delivered through the system can better be accommodated with an increased supercharge pressure, and flow losses due to leakage can be made up more readily.

During normal forward driving operation under torque, check valve 192 will be closed since the pressure in passage 158 exceeds the pressure in passage 197. Passage 198 communicates with one side of the check valve 192 through a passage 286. During reverse drive or during vehicle coastdown, the passage 160 becomes a high pressure passage and the passage 158 becomes a low pressure passage as explained previously. Under these conditions check valve 192 will be opened and check valve 190 will close. The supercharge pump 110 then will supply directly the passage 158 rather than the passage 160.

It thus is apparent that for each throttle setting a constant engine speed will exist regardless of varying loads. If the load increases, however, the vehicle operator normally desires to maintain a constant vehicle speed. For this reason he tends to increase the degree of engine carburetor throttle setting. This then causes a new balance point for the ratio control valve to occur as a corresponding change in torque ratio in the transmission takes place. This increased load tends to increase the magnitude of the pressure on the high pressure side of the hydrostatic circuit. To limit the magnitude of this pressure build-up to a safe value, I have provided the pressure limit valve 186. This valve includes a valve spool 282' that is formed with two valve lands 284' and 286. Spool 282' is slidably situated within a valve chamber 288 and is spring biased in a right-hand direction as viewed in FIGURE 5A by a spring 290. Line pressure is distributed to the valve chamber 288 through a branch passage 292. An exhaust port 294 also communicates with the chamber 288 at a location spaced from the passage 292. An output pressure passage for the pressure limit valve is identified by reference character 296. This passage communicates with the chamber 288 at a location intermediate port 294 and the passage 292. It extends to the valve chamber 206 of the ratio control valve 182 and is effective to distribute pressure to the differential area defined by ratio control valve lands 204 and 202. When passage 296 is pressurized, an auxiliary pressure force on the ratio control valve spool is established. This auxiliary force supplements the action of the governor pressure force.

The throttle pressure signal in passage 248 and in passage 282 is distributed to the valve chamber 288 and acts upon the left-hand side of valve spool 282'.

A valve stem 298 is carried by the spool 282' and is slidably received within a cooperating valve bore that in turn is in fluid communication with passage 286. Thus, the pressure on the high pressure side of the hydrostatic circuit acts upon the stem 298 to urge the spool 282' in a left-hand direction against the opposing force of spring 290 and the opposing influence of the pressure force established by the throttle pressure signal.

Passage 292 normally is blocked by land 284'. Also, passage 296 normally is exhausted through exhaust port 294. If the pressure on the high pressure side of the hydrostatic circuit should increase to a predetermined value for any given magnitude of the throttle valve signal, the pressure force acting on the stem 298 will cause the spool 282 to shift in a left-hand direction thereby establishing controlled communication between passage 292 and passage 296. As passage 296 becomes pressurized, the ratio control valve balance point becomes upset and the spool 196 will tend to shift in a left-hand direction to reduce the torque ratio to a value that is less than that which normally would be obtained. The pressure limit valve 186 thus overrules or modifies the norm function of the ratio control valve 182. The threshold pressure value at which the limit valve becomes operative is dependent upon the magnitude of the throttle valve signal. As the engine carburetor throttle setting increases, the threshold value is increased accordingly.

A cooler 300 may be provided in the system to stabilize oil temperature. The cooler 300 is supplied with a flow of oil through a passage 302 that communicates with line pressure passage 197. A flow restricting orifice 304 is provided in passage 302 to restrict flow and to prevent an excessive pressure drop in the system. A relief valve 306 in the form of a one-way check valve is calibrated to provide one-way flow through the cooler at a desired pressure level.

It is desirable in an arrangement of this type to prevent the engine speed from increasing to its normal regulated value as the vehicle is accelerated from a standing start. During the start-up period the engine speed should be kept at an abnormally reduced value although it should be allowed to accelerate gradually until a cruising condition is established following the acceleration period. The pressure limit valve performs this function. If we assume for purposes of discussion that the pressure limit valve is absent, the engine speed will tend to increase to a value that is determined by the calibration of the ratio control valve as the vehicle operator advances the engine carburetor throttle to some appropriate setting when the vehicle is stalled. Since the torque of the engine then would exceed the road load requirements the vehicle would accelerate while the engine maintains that high regulated engine speed. To avoid this undesirable situation during vehicle start-up, the pressure limit valve is calibrated so that it will supply auxiliary pressure to passage 296 at low engine speeds during the acceleration period. As the engine throttle setting is advanced during start-up, the pressure in passage 286 increases. This causes passage 292 to be brought into controlled communication with passage 296 as the port 294 becomes restricted. This creates a pressure force on the ratio control valve spool 196 that acts in a left-hand direction. The ratio controlling pistons thus are incapable of causing an adjustment of the displacement of the hydrostatic unit 20 to that value that would correspond to the normal regulated engine speed for that particular engine throttle setting.

As the vehicle continues to accelerate, however, and as it approaches a cruising condition, the pressure in passage 158 and 286 then becomes reduced in value. This then causes the passage 292 to again become blocked by land 284 while passage 296 again becomes exhausted through port 294. This transition takes place gradually so that a modulated pressure is made available in passage 296 during the acceleration period. The magnitude of this modulated pressure gradually decreases as the cruising condition is approached, and hence the influence of this modulated pressure on the ratio control valve gradually diminishes until it becomes zero. When it does become zero the ratio control valve functions in the usual fashion to maintain the optimum regulated engine speed for each engine throttle setting that will correspond to the minimum brake specific fuel consumption point for the engine.

Having thus described a preferred embodiment of my invention, what I claim and desire to secure by U.S. Letters Patent is:

1. In a hydrostatic power transmission system adapted to deliver driving torque from a throttle controlled engine to a driven member, a pair of hydrostatic fluid displacement units situated in a closed hydrostatic circuit, first fluid pressure operated servo means for increasing the relative displacement of said units, second fluid pressure operated servo means for decreasing the relative displacement of said units, a source of regulated line pressure, fluid pressure distributor passage means including separate portions extending to each servo means for distributing pressure from said source to said servo means, a ratio control valve means situated in and partly defining said passage means for controlling the pressure distribution to each of said portions, a source of an engine speed sensitive pressure signal, a source of a throttle pressure signal that is proportional in magnitude to engine throttle setting, means for distributing each of said signals to opposed sides of said ratio control valve means, said ratio control valve means responding to an increase in engine speed for any given throttle setting to increase the speed-ratio of said system and responding to an increase in engine throttle setting for any given engine speed to increase the speed-ratio of said system, a pressure limit valve having one portion thereof in fluid communication with a high pressure portion of said circuit and an opposed portion thereof in communication with said throttle pressure signal source, a fluid connection between said line pressure source and said pressure limit valve and a fluid connection between said limit valve and said ratio control valve means whereby an auxiliary pressure is made available to said ratio control valve means to augment the influence of said governor pressure signal, said pressure limit valve responding to an increase in the pressure in the high pressure side of said circuit for any given engine throttle setting to supply an auxiliary pressure to said ratio control valve means thereby modifying the engine speed for any given throttle position during the acceleration period.

2. In a hydrostatic power transmission system adapted to deliver driving torque from a throttle controlled engine to a driven member, a pair of hydrostatic fluid displacement units situated in a closed hydrostatic circuit, first fluid pressure operated servo means for increasing the relative displacement of said units, second fluid pressure operated servo means for decreasing the relative displacement of said units, a source of regulated line pressure, fluid pressure distributor passage means including separate portions extending to each servo means for distributing pressure from said source to said servo means, a ratio control valve means situated in and partly defining said passage means for controlling the pressure distribution to each of said portions, a source of an engine speed sensitive pressure signal, a source of a throttle pressure signal that is proportional in magnitude to engine throttle setting, means for distributing each of said signals to opposed sides of said ratio control valve means, said ratio control valve means responding to an increase in engine speed for any given throttle setting to increase the speed-ratio of said system and responding to an increase in engine throttle setting for any given engine speed to increase the speed-ratio of said system, a pressure limit valve having one portion thereof in fluid communication with a high pressure portion of said circuit and an opposed portion thereof in communication with said throttle pressure signal source, a fluid connection between said line pressure source and said pressure limit valve and a fluid connection between said limit valve and said ratio control valve means whereby an auxiliary pressure is made available to said ratio control valve means to augment the influence of said governor pressure signal, said pressure limit valve responding to an increase in the pressure in the high pressure side of said circuit for any given engine throttle setting to supply an auxiliary pressure to said ratio control valve means thereby modifying the engine speed for any given throttle position during the acceleration period, and a precalibrated valve spring acting upon said pressure limit valve to exert a force thereon that supplements the fluid pressure force of said throttle pressure.

3. A hydrostatic power transmission mechanism adapted to deliver driving torque from an internal combustion vehicle engine to a driven member and comprising a pair of fluid displacement units each having a rotary cage with radial cylindrical openings formed therein, ball piston elements received in said openings, a cam ring surrounding the ball piston elements for each unit, a housing surrounding said units, the cam ring for one of said units being anchored to said housing, passage structure interconnecting the radially inward regions of the cylindrical openings of each cage thereby establishing a closed hydrostatic circuit, the cage for said one hydrostatic unit and the cam ring for said other hydrostatic unit being connected to said engine, the cage for said other hydrostatic unit being connected to said driven member, first fluid pressure operated servo means for increasing the relative displacement of said units, second fluid operated servo means for decreasing the relative displacement of said units, a source of regulated line pressure, fluid pressure distributor passage means including separate portions extending to each servo means for distributing pressure from said source to said servo means, a ratio control valve means situated in and partly defining said passage means for controlling the pressure distribution to each of said portions, a source of an engine speed sensitive pressure signal, a source of a throttle pressure signal that is proportional in magnitude to engine throttle setting, means for distributing each of said signals to opposed sides of said ratio control valve means, said ratio control valve means responding to an increase in engine speed for any given throttle setting to increase the speed-ratio of said system and responding to an increase in engine throttle setting for any given engine speed to increase the speed-ratio of said system, a pressure limit valve having one portion thereof in fluid communication with a high pressure portion of said circuit and an opposed portion thereof in communication with said throttle pressure signal source, a fluid connection between said line pressure source and said pressure limit valve and a fluid connection between said limit valve and said ratio control valve means whereby an auxiliary pressure is made available to said ratio control valve means to augment the influence of said governor pressure signal, said pressure limit valve responding to an increase in the pressure in the high pressure side of said circuit for any given engine throttle setting to supply an auxiliary pressure to said ratio control valve means thereby modifying the engine speed for any given throttle position during the acceleration period.

4. A hydrostatic power transmission mechanism adapted to deliver driving torque from an internal combustion vehicle engine to a driven member and comprising a pair of fluid displacement units each having a rotary cage with radial cylindrical openings formed therein, ball piston elements received in said openings, a cam ring surrounding the ball piston elements for each unit, a housing surrounding said units, the cam ring for one of said units being anchored to said housing, passage structure interconnecting the radially inward regions of the cylindrical openings of each cage thereby establishing a closed hydrostatic circuit, the cage for said one hydrostatic unit and the cam ring for said other hydrostatic unit being connected to said engine, the cage for said other hydrostatic unit being connected to said driven member, first fluid pressure operated servo means for increasing the relative displacement of said units, second fluid pressure operated servo means for decreasing the relative displacement of said unit, a source of regulated line pressure, fluid pressure distributor passage means including separate portions extending to each servo means for distributing pressure from said source to said servo means, a ratio control valve means situated in and partly defining said passage means for controlling the pressure distribution to each of said portions, a source of an engine speed sensitive pressure signal, a source of a throttle pressure signal that is proportional in magnitude to engine throttle setting, means for distributing each of said signals to opposed sides of said ratio control valve means, said ratio control valve means responding to an increase in engine speed for any given throttle setting to increase the speed-ratio of said system and responding to an increase in engine throttle setting for any given engine speed to increase the speed-ratio of said system, a pressure limit valve having one portion thereof in fluid communication with a high pressure portion of said circuit and an opposed portion thereof in communication with said throttle pressure signal source, a fluid connection between said line pressure source and said pressure limit valve and a fluid connection between said limit valve and said ratio control valve means whereby an auxiliary pressure is made available to said ratio control valve means to augment the influence of said governor pressure signal, said pressure limit valve responding to an increase in the pressure in the high pressure side of said circuit for any given engine throttle setting to supply an auxiliary pressure to said ratio control valve means thereby modifying the engine speed for any given throttle position during the acceleration period, and a precalibrated valve spring acting upon said pressure limit valve to exert a force thereon that supplements the fluid pressure force of said throttle pressure.

5. In a hydrostatic power transmission system adapted to deliver driving torque from an internal combustion engine to a driven member, a pair of hydrostatic fluid displacement units disposed in a common hydrostatic fluid circuit and defining a power flow path between said engine and said driven member, fluid pressure sensitive means for varying the relative displacement of said units, a driven speed pressure signal source, a source of a pressure signal that is related to engine torque, a hydraulic passage means extending from a high pressure region of said system to said pressure sensitive means, ratio control valve means disposed in and partly defining said passage means for controlling distribution of pressure to opposed portions of said pressure sensitive means to effect changes in said relative displacement, said ratio control valve means communicating with each signal source and responding to changes in the magnitude of said signals, and limit valve means communicating with said engine torque pressure signal source and responding to said engine torque pressure signal for overruling the pressure distributing action of said ratio control valve means thereby suppressing engine speed during the initial stages of the period of acceleration of said driven member.

6. In a hydrostatic power transmission adapted to deliver driving torque from an engine to a driven member, a pair of hydrostatic fluid displacement units disposed in a common hydrostatic fluid circuit and defining a power flow path between said engine and said driven member, fluid pressure sensitive means for varying the relative displacement of said units, a driven speed pressure signal source, a source of a pressure signal that is related in magnitude to engine torque, a hydraulic passage means extending from a high pressure region of said system to said pressure sensitive means, ratio control valve means disposed in and partly defining said passage means for controlling distribution of pressure to opposed portions of said pressure sensitive means to effect changes in said relative displacement, said ratio control valve means communicating with each signal source and responding to changes in the magnitude of said signals, and limit valve means for modifying the pressure distributing action of said control valve means thereby modifying the relationship between engine speed and the speed ratio of said transmission, said limit valve means being in fluid communication with a high pressure portion of said fluid circuit and with said engine torque pressure signal source and responding to changes in said engine torque pressure signal for establishing a threshold value for the pressure in said high pressure circuit portion above which said limit valve means functions to modify the calibration of said ratio control valve means.

7. In a hydrostatic power transmission adapted to deliver driving torque from an engine to a driven member, a pair of hydrostatic fluid displacement units disposed in a common hydrostatic fluid circuit and defining a power flow path between said engine and said driven member, fluid pressure sensitive means for varying the relative displacement of said units, a driven speed pressure signal source, a source of a pressure signal that is related to engine torque, a hydraulic passage means extending from a high pressure region of said system to said pressure sensitive means, ratio control valve means disposed in and partly defining said passage means for controlling distribution of pressure to opposed portions of said pressure sensitive means to effect changes in said relative displacement, said ratio control valve means communicating with each signal source and responding to changes in the magnitude of said signals, and limit valve means for modifying the pressure distributing action of said control valve means thereby modifying the relationship between engine speed and the speed ratio of said transmission system, said limit valve means being in fluid communication with a high pressure portion of said fluid circuit and with said engine torque pressure signal source and responding to changes in said engine torque pressure signal for establishing a threshold value for the pressure in said high pressure circuit portion above which said limit valve means functions to modify the calibration of said ratio control valve means, said limit valve means and said ratio control valve means being in fluid communication whereby the former distributes to the latter a pressure signal the magnitude of which is determined by the magnitude of the pressure in said high pressure circuit portion when said high pressure circuit portion is pressurized with a pressure that exceeds said threshold value.

8. In a hydrostatic power transmission adapted to deliver driving torque from an engine to a driven member, a pair of hydrostatic fluid displacement units disposed in a common hydrostatic fluid circuit and defining a power flow path between said engine and said driven member, fluid pressure sensitive means for varying the relative displacement of said units, a driven speed pressure signal source, a source of a pressure signal that is related to engine torque, a hydraulic passage means extending from a high pressure region of said system to said pressure sensitive means, ratio control valve means disposed in and partly defining said passage means for controlling distribution of pressure to opposed portions of said pressure sensitive means to effect changes in said relative displacement, said ratio control valve means communicating with each signal source and responding to changes in the magnitude of said signals, and limit valve means for modifying the pressure distributing action of said control valve means thereby modifying the relationship between engine speed and the speed ratio of said transmission system, said limit valve means being in fluid communication with a high pressure portion of said fluid circuit and with said engine torque pressure signal source and responding to changes in said engine torque pressure signal for establishing a threshold value for the pressure in said high pressure circuit portion above which said limit valve means functions to modify the calibration of said ratio control valve means, said pressure limit valve means and said ratio control valve means being in fluid communication whereby the former distributes to the latter a pressure signal that produces a pressure force on said ratio control valve means that supplements the force produced thereon by said speed pressure signal.

References Cited by the Examiner

UNITED STATES PATENTS

| | | | |
|---|---|---|---|
| 2,186,556 | 1/1940 | Robbins | 60—53 |
| 2,866,150 | 12/1958 | Lewis | 60—53 |
| 3,031,848 | 5/1962 | Kane et al. | 60—53 |
| 3,139,723 | 7/1964 | Hollowell | 60—19 |

FOREIGN PATENTS

| | | |
|---|---|---|
| 363,331 | 6/1930 | Great Britain. |
| 71,538 | 1/1953 | Netherlands. |

SAMUEL LEVINE, *Primary Examiner.*

EDGAR W. GEOGHEGAN, *Examiner.*